(12) United States Patent
Song et al.

(10) Patent No.: US 8,358,835 B2
(45) Date of Patent: Jan. 22, 2013

(54) METHOD FOR DETECTING AND CORRECTING CHROMATIC ABERRATION, AND APPARATUS AND METHOD FOR PROCESSING IMAGE USING THE SAME

(75) Inventors: Woo-Jin Song, Gyeongbuk (KR); Soon-Wook Chung, Gyeonggi-do (KR); Byoung-Kwang Kim, Gyeongsangnam-go (KR)

(73) Assignee: Postech Academy—Industry Foundation, Gyeongbuk (KR)

( * ) Notice: Subject to any disclaimer, the term of this patent is extended or adjusted under 35 U.S.C. 154(b) by 537 days.

(21) Appl. No.: 12/615,729

(22) Filed: Nov. 10, 2009

(65) Prior Publication Data

US 2010/0166305 A1 Jul. 1, 2010

(30) Foreign Application Priority Data

Dec. 31, 2008 (KR) .................. 10-2008-0138054

(51) Int. Cl.
*G06K 9/00* (2006.01)
(52) U.S. Cl. ........................................ 382/162
(58) Field of Classification Search ................ None
See application file for complete search history.

(56) References Cited

U.S. PATENT DOCUMENTS

| | | | | |
|---|---|---|---|---|
| 6,947,607 B2* | 9/2005 | Perlmutter et al. | ........... | 382/266 |
| 7,564,497 B2* | 7/2009 | Mihara et al. | ................. | 348/345 |
| 7,656,437 B2* | 2/2010 | Yamada et al. | ............. | 348/228.1 |
| 7,656,444 B2* | 2/2010 | Hara | .............. | 348/246 |
| 7,667,738 B2* | 2/2010 | Utsugi | ...................... | 348/222.1 |
| 8,040,412 B2* | 10/2011 | Yamamoto | ..................... | 348/273 |
| 2004/0080639 A1* | 4/2004 | Ishiga | ............................ | 348/272 |
| 2007/0035641 A1 | 2/2007 | Yamada et al. | | |
| 2008/0062409 A1 | 3/2008 | Utsugi | | |

FOREIGN PATENT DOCUMENTS

| | | |
|---|---|---|
| JP | 2006-020275 A | 1/2006 |
| JP | 2006-135805 A | 5/2006 |
| KR | 1020070026288 A | 3/2007 |

OTHER PUBLICATIONS

English abstract for Japanese Publication No. 2006/020275 published on Jan. 19, 2006, 1 page.
English abstract for Japanese Publication No. 2006/0135805 published on May 25, 2006, 1 page.
English abstract for Korean Publication No. 1020070026288 A published on Mar. 8, 2007, 1 page.

* cited by examiner

*Primary Examiner* — Samir Ahmed
(74) *Attorney, Agent, or Firm* — Osha Liang LLP

(57) ABSTRACT

A method for detecting and correcting a chromatic aberration, and an apparatus and method for processing an image using the same are provided. A chromatic aberration is detected by dividing an edge portion of the image into static areas where a color varies below a reference value and a dynamic area where a color varies above the reference value, calculating a intensity difference value between at least one reference color and a comparative color for each of the static areas and the dynamic area, and determining at least one pixel having a intensity difference value exceeding a range of intensity difference values in the static areas among pixels in the dynamic area, as a chromatic aberration region. The chromatic aberration is corrected by correcting the intensity difference value for the pixels in the chromatic aberration region using a correction value in the intensity difference value range in the static area.

12 Claims, 15 Drawing Sheets

F I G . 4a
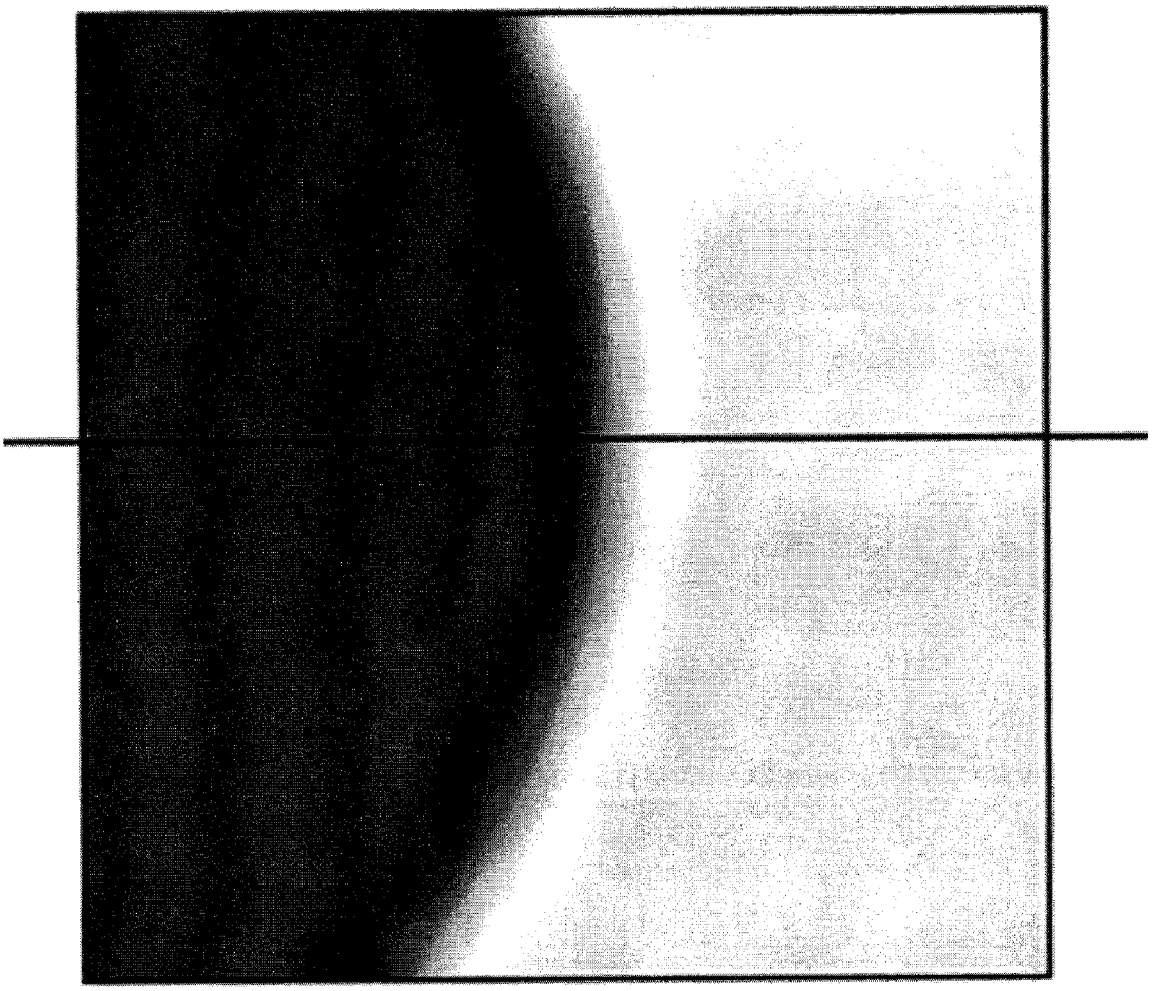

FIG. 8b
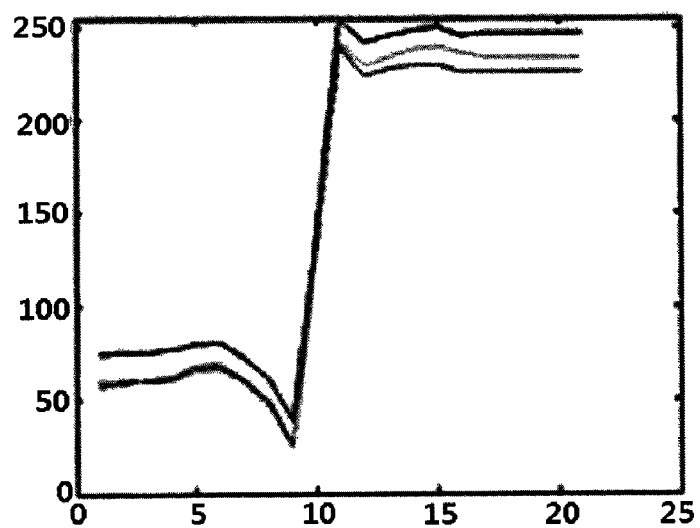
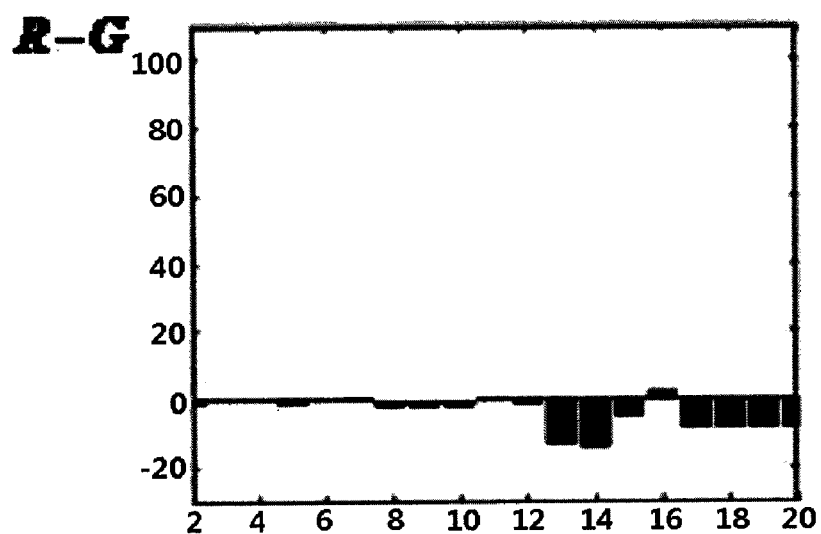
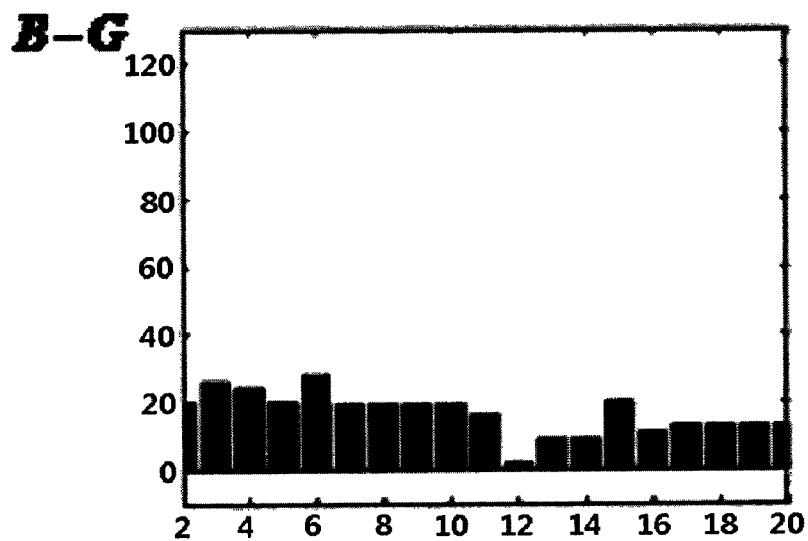

F I G . 9a
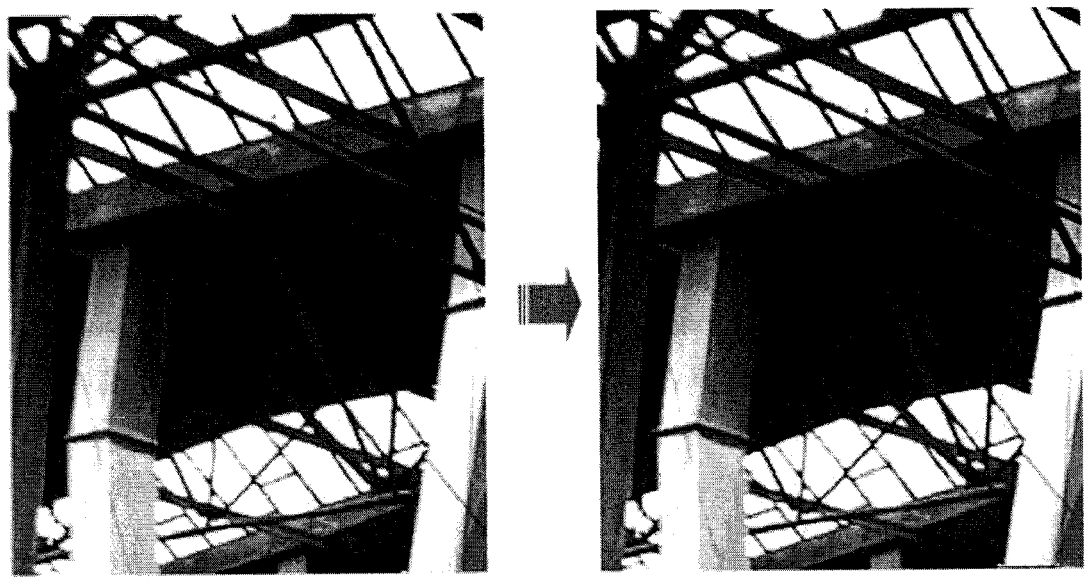

METHOD FOR DETECTING AND CORRECTING CHROMATIC ABERRATION, AND APPARATUS AND METHOD FOR PROCESSING IMAGE USING THE SAME

CROSS-REFERENCE TO RELATED APPLICATION

This application claims the benefit under 35 U.S.C. §119 (a) of Korean Patent Application No. 2008-138054, filed on Dec. 31, 2008, the disclosure of which is incorporated herein in its entirety by reference.

BACKGROUND

1. Technical Field

The present invention relates to chromatic aberration detection and correction, and image processing using the detection and correction.

2. Description of the Related Art

In image devices using lenses such as cameras, a variety of aberrations occur due to a unique property of the lens. Typical examples of the aberrations include Seidel's 5 aberrations, which are monochromatic aberrations. These aberrations include a spherical aberration, a coma aberration, an astigmatism aberration, a distortion aberration, and a curvature distortion, which are based on a spherical surface of lens.

Also, there are chromatic aberration in which false colors are generated due to a different refractive index for a lens according to a wavelength of light. Chromatic aberration refers to a phenomenon in which a color fringe is formed around a boundary of an image as light passing through a lens is divided due to a physical property of a different refractive index of the lens according to a wavelength of light, such that the image is not formed on the same portion of a sensor. The chromatic aberration phenomenon may be classified as a longitudinal chromatic aberration in which a color blurs due to a different focal distance on an optical axis according to a wavelength of light, or a lateral chromatic aberration phenomenon in which a different magnification of an image appears according to a distance from an optical axis.

Chromatic aberration phenomena occur in all image devices using lenses. To reduce the chromatic aberration phenomenon, a lens has been formed of a special material. This increases the price of the lens, which is not applicable to small cameras having non-detachable lenses. Alternatively, methods of correcting such a distortion through image processing, mainly using additional information such as camera settings upon photographing, have been developed. Automatic correction methods for correcting chromatic aberrations using only image information without such additional information have also been studied.

Recently, high resolution cameras have been developed for high image quality. The high resolution cameras suffer from chromatic aberration due to smaller pixels of a sensor. To reduce the chromatic aberration phenomenon, a lens has been formed of a special material. This increases the price of the lens, which is not applicable to small cameras having non-detachable lenses.

Chromatic aberration correction schemes using image processing have been studied to correct chromatic aberrations in small cameras. Mainly, schemes of calculating a magnification difference of an image for each color with reference to a center point of a distortion and warping the image to correct a lateral chromatic aberration have been studied. Also, schemes of designating all specific colors near bright areas, such as a purple fringe, as having a chromatic aberration and then correcting the chromatic aberration using adjacent signals have been studied.

Most conventional schemes are focused on detection and correction of a lateral chromatic aberration that can be easily analyzed and corrected. The schemes require information on camera settings upon photographing images or additional information such as photographed images for a certain test pattern. Schemes requiring no additional information have different correction performance according to accuracy of estimation of a center point of a distortion upon correcting a lateral chromatic aberration. In addition, since the lateral chromatic aberration and the longitudinal chromatic aberration occur simultaneously upon photographing images, a sufficient correction result cannot be obtained due to presence of the longitudinal chromatic aberration even when the lateral chromatic aberration is accurately corrected.

A phenomenon in which false colors are generated in an edge of an image due to a different point image distribution according to a wavelength of light is called purple fringe. Since the scheme of designating all specific colors near a bright area such as a purple fringe as having a chromatic aberration and correcting the chromatic aberration using adjacent signals is used to detect and correct distortions of the specific colors, it can effectively remove the specific colors such as the purple fringe, but cannot detect all colors with chromatic aberration. Further, false matches and mismatching of areas may cause a severe blurring phenomenon.

SUMMARY

The present invention is directed to a method for detecting and correcting a chromatic aberration, and an apparatus and method for processing an image using the same, which are capable of detecting all regions violating an essential principle of an edge of the image where chromatic aberrations are prominent as having chromatic aberrations, using a intensity difference value between colors at the edge, and then providing a correction value for the regions with chromatic aberrations using intensity difference values of neighbors having no chromatic aberrations to perform chromatic aberration detection and correction.

According to some example embodiments of the present invention, there is provided a method for processing an image, the method including: dividing an edge portion of the image into static areas where a color varies below a reference value and a dynamic area where a color varies above the reference value; calculating a intensity difference value between at least one reference color and a comparative color for each of the static areas and the dynamic area; determining at least one pixel having a intensity difference value exceeding a range of intensity difference values in the static areas among pixels in the dynamic area, as a chromatic aberration region; and correcting a intensity difference value for pixels in the chromatic aberration region.

Determining the at least one pixel having a intensity difference value exceeding a range of intensity difference values in the static area among pixels in the dynamic area, as a chromatic aberration region may include: calculating maximum and minimum intensity difference values between a first reference color and the comparative color in the static area; and determining whether intensity difference values for the pixels in the dynamic area deviate from a range between the minimum and maximum intensity difference values.

Correcting the intensity difference value may include correcting the intensity difference value for the pixels in the chromatic aberration region using a correction value in the intensity difference value range in the static area.

The correction value may be set as one between the maximum and minimum intensity difference values in the static area using linear interpolation.

The comparative color and the at least one reference color may be colors in a RGB color space. The comparative color may be a green color.

The comparative color and the at least one reference color may be colors in any of a CMY color space, a HSI color space, a CIE color space, and a YCbCr color space.

The method may further include representing the at least one reference color for the pixels in the chromatic aberration region on which correction for the intensity difference values is performed.

According to another example embodiment of the present invention, there is provided an apparatus for processing an image, wherein: the apparatus detects a chromatic aberration by dividing an edge portion of the image into static areas where a color varies below a reference value and a dynamic area where a color varies above the reference value, calculating a intensity difference value between at least one reference color and a comparative color for each of the static areas and the dynamic area, and determining at least one pixel having a intensity difference value exceeding a range of intensity difference values in the static areas among pixels in the dynamic area, as a chromatic aberration region; and corrects the chromatic aberration by correcting the intensity difference value for the pixels in the chromatic aberration region using a correction value in the intensity difference value range in the static area.

According to a still another example embodiment of the present invention, there is provided a method for detecting and correcting a chromatic aberration in image processing that represents colors based on a RGB color space, the method including: dividing an edge portion of an image into static areas where a color varies below a reference value and a dynamic area where a color varies above the reference value; calculating a intensity difference value between a green color and first and second reference colors for the static areas and the dynamic area; determining at least one pixel having a intensity difference value exceeding a range of intensity difference values in the static areas among pixels in the dynamic area, as a chromatic aberration region; and correcting a intensity difference value for pixels in the chromatic aberration region to represent the first and second reference colors.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

FIG. 4a illustrates an image including a portion with a chromatic aberration, and FIG. 4b illustrates graphs showing a intensity difference value for each color in a portion with a chromatic aberration at an edge of the portion in FIG. 4a;

FIG. 8b illustrates graphs showing a RGB signal and a intensity difference value obtained by performing the chromatic aberration correction on the image of FIG. 4 according to one example embodiment of the present invention; and FIGS. 9a and 9b illustrate images obtained by performing a chromatic aberration correction according to example embodiments of the present invention.

DETAILED DESCRIPTION OF EMBODIMENTS

Figure 1:
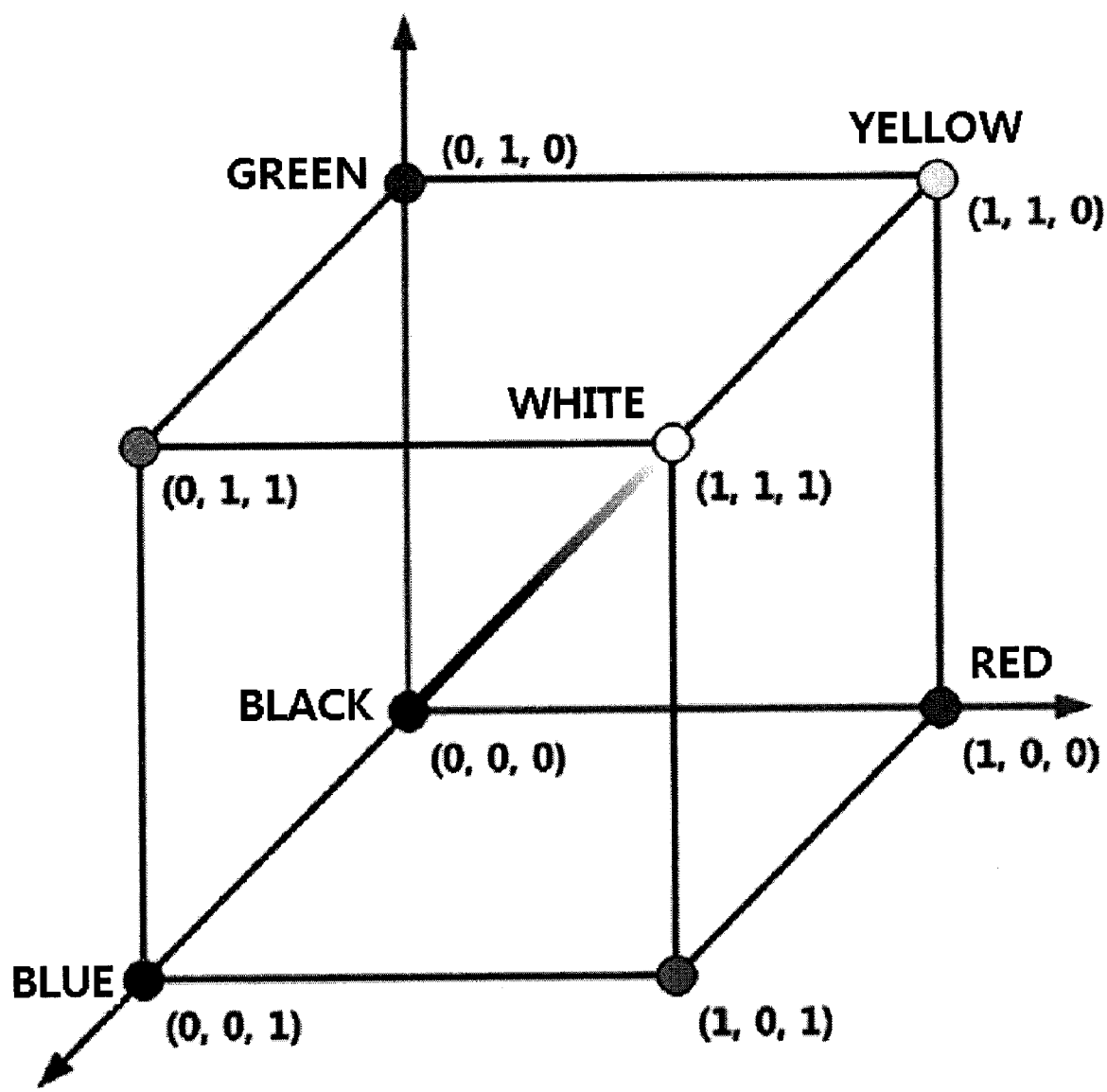
FIG. 1 illustrates a structure of a RGB color space according to one example embodiment of the present invention.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

The present invention proposes a scheme of detecting and correcting a chromatic aberration area with only one image with chromatic aberration without additional photographing information upon acquiring an image, unlike the above-described schemes.

Example embodiments of the present invention will be described in greater detail with reference to the accompanying drawings. Like numbers refer to like elements throughout the description of the figures and descriptions of the same components will not be repeated.

FIG. 1 illustrates a structure of a RGB color space according to one example embodiment of the present invention.

Generally, a color space refers to a method for representing colors using ordered pairs (generally, three or four ordered pairs) of numerical values when each color is represented by ordered pairs having some components in an abstract mathematical model. Digital images are basically stored as RGB data. Image input devices such as cameras or scanners store an intensity of light as RGB data, and image output devices such as display devices or printers represent the RGB data using colors. However, the input devices store different RGB data for the same subject, and the output devices reproduce different colors for the same RGB data. As such, the RGB data depends on the devices. Variants of the RGB color space include a CMY color space, a HSI color space, a CIE color space, a YCbCr color space, etc.

The RGB color space is a regular hexahedral space with three orthogonal axes using red R, green G, and blue B as three primary colors. In FIG. 1, maximum intensities of lights of the three primary colors are normalized to 1. Black is located at an origin (0, 0, 0), and blue is located at (0, 0, 1). Cyan, magenta, and yellow, obtained by mixing two of the primary color lights at maximum intensities, are located at (0, 1, 1), (1, 0, 1) and (1, 1, 0). Also, white obtained by mixing all three of the primary color lights at maximum intensities, is located at (1, 1, 1). A color obtained by mixing the three primary colors lights at certain intensities is located at one point inside the regular hexahedron.

If the intensity of the primary color light is adjusted to 8 bits, each primary color may be represented by 256 tones. Accordingly, a total of 256×256×56=16,777,216 colors are distributed inside the regular hexahedral space and each component of a color coordinate can be represented by a value ranging from 0 to 255. In this case, color coordinates of the above-described primary colors may be indicated as (255, 0, 0), (0, 255, 0), and (0, 0, 255), respectively. A distribution of colors outside the regular hexahedron is shown in FIG. 1. However, the color distribution is shown roughly and actual colors appearing on a screen of a monitor depend on a type or property of the monitor.

Figure 2:
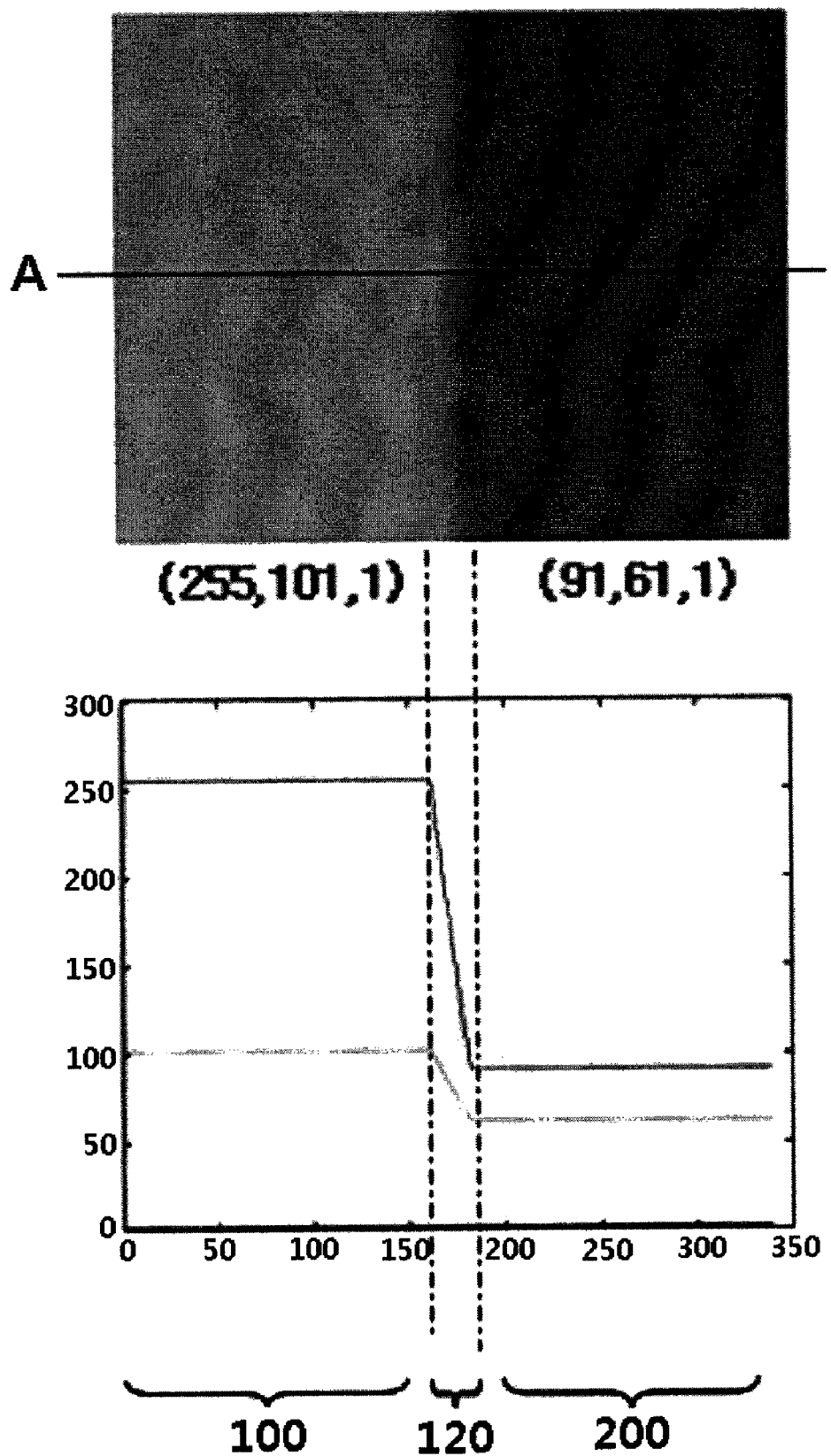
FIG. 2 illustrates an edge area of a general image without a chromatic aberration and a graph showing a RGB signal in the edge area of the image.

FIG. 2 illustrates an edge area of a general image without a chromatic aberration and a graph showing a RGB signal in the edge area of the image.

In FIG. 2, coordinates (255, 101, 1) and (91, 61, 1) indicated below the image are color coordinate values in the RGB color space in FIG. 1. The left coordinate (255, 101, 1) indicates a color including a maximum red component, a moderate green component, and a slight blue component. On the other hand, the right coordinate (91, 61, 1) indicates a color including a moderate red component, a weak green component, and a slight blue component.

The graph in FIG. 2 shows a RGB signal of a color for each image pixel, taken along line A of the edge image of FIG. 2. In the graph, a horizontal axis indicates pixel values along line A of the image of FIG. 2. The graph is divided into static areas 100 and 200 where a color varies below a predetermined reference value, and a dynamic area 120 between the two static areas where a color varies above the reference value. It can be seen from the dynamic area 120 that a value of a red color varies from 255 to 91 and a value of a green color varies from 101 to 61.

Figure 3A:
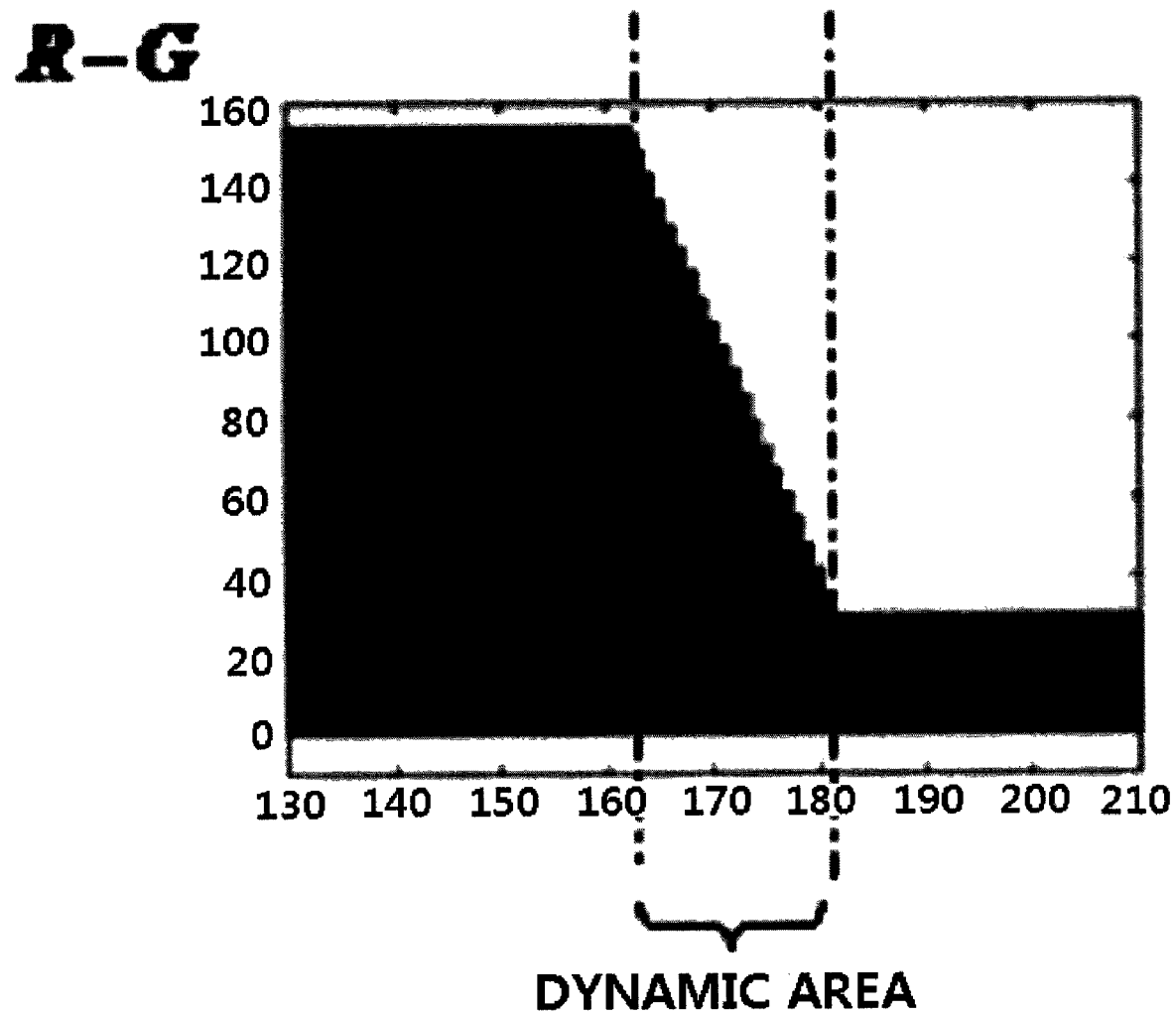
FIG. 3a illustrates a intensity difference value between red and green colors in a dynamic area of FIG. 2.
Figure 3B:
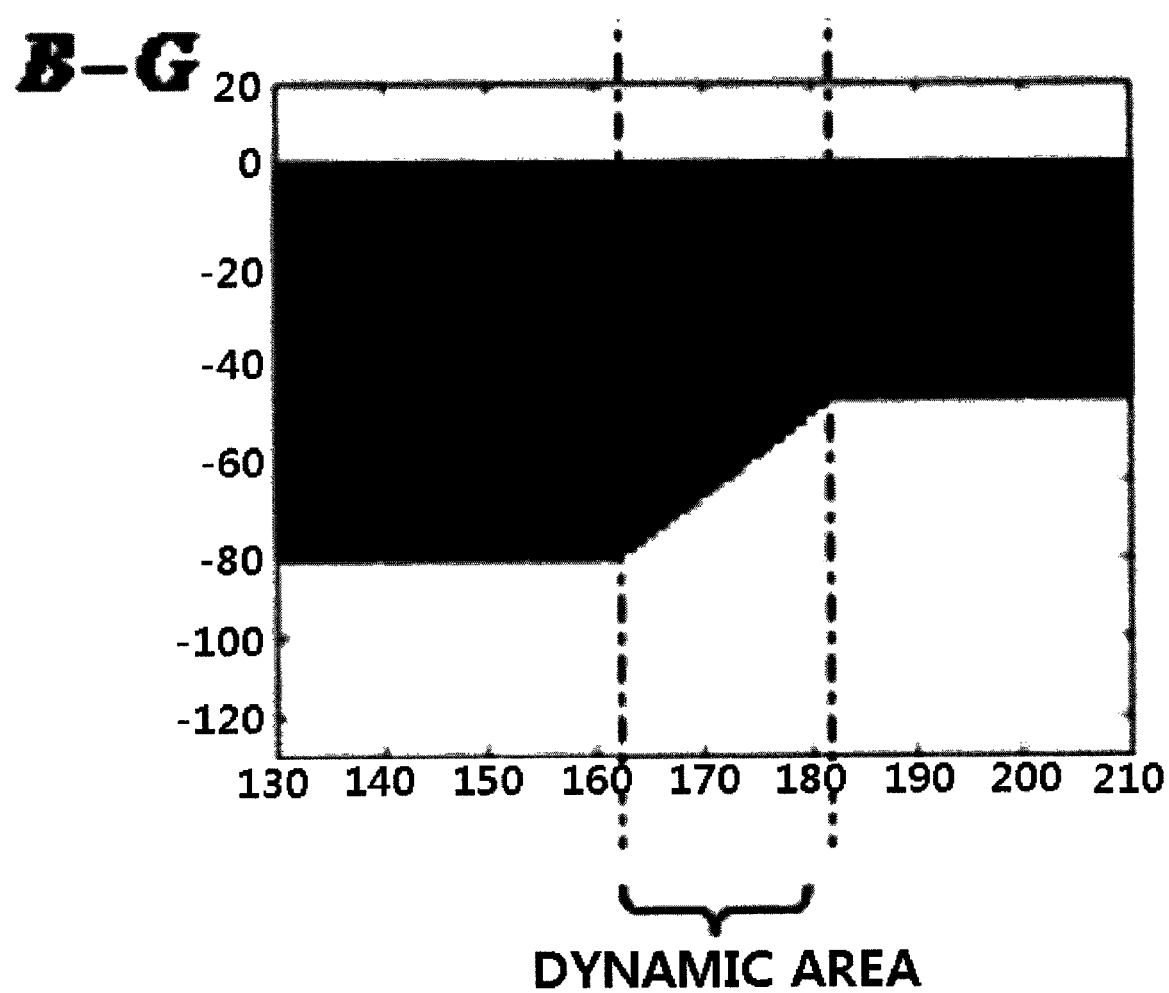
FIG. 3b illustrates a intensity difference value between blue and green colors in the dynamic area of FIG. 2.

FIG. 3a illustrates a intensity difference value between red and green colors in the dynamic area of FIG. 2, and FIG. 3b illustrates a intensity difference value between blue and green colors in the dynamic area of FIG. 2.

In other words, the intensity difference between the red color and the green signal is shown as a comparative reference in FIG. 3a, and a intensity difference between the blue color and the green signal is shown as a comparative reference in FIG. 3b. In an example embodiment of FIG. 3, the green color is used as the comparative reference signal because the green color attracts the highest attention due to its luminance and has the least blur. However, a color other than the green color may be used as the comparative reference signal according to a color model other than a RGB color model or use of the image.

The static areas and the dynamic area in FIGS. 3a and 3b correspond to the static areas 100 and 200 and the dynamic area 120 in FIG. 2. Referring to FIGS. 3a and 3b, a intensity difference value for each color at pixels in the dynamic area 120 is above a minimum intensity difference value in the static areas 100 and 200, located at both sides of the dynamic area 120, and below a maximum intensity difference value in the static areas 100 and 200. That is, it can be seen from FIGS. 3a and 3b that, in a general image having no area with a chromatic aberration, a intensity difference value for each color at pixels in the dynamic area 120 is located between the minimum intensity difference value and the maximum intensity difference value in the static areas.

Figure 4B:
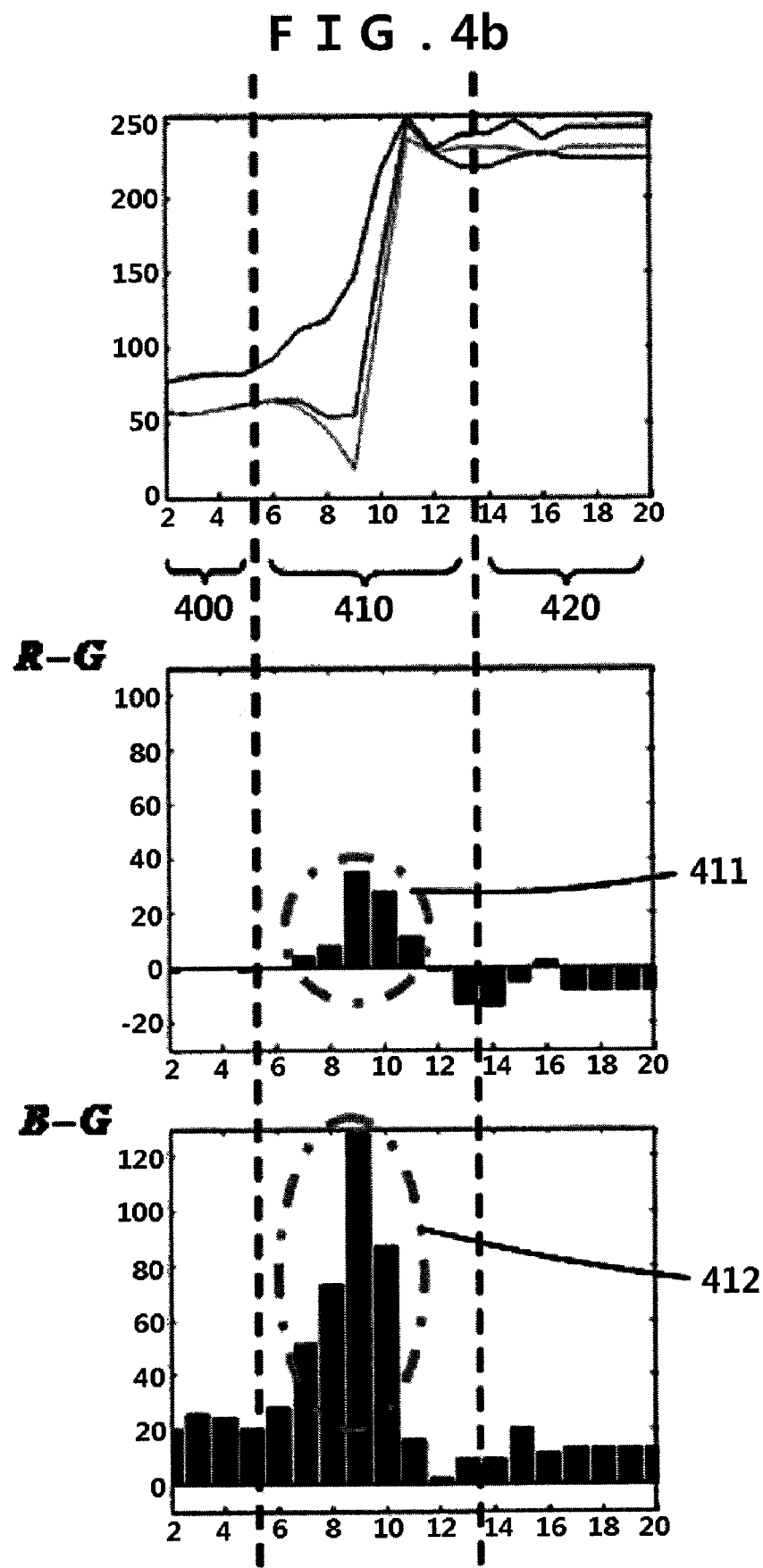

FIG. 4a illustrates an image including a portion with a chromatic aberration, and FIG. 4b illustrates graphs showing a intensity difference value for each color in a portion with a chromatic aberration at an edge of the portion in FIG. 4a.

It can be seen that the image in FIG. 4a has a color fringe around a boundary of a circle, unlike the image in FIG. 2. This phenomenon is referred to as a chromatic aberration, as described above.

In the graphs in FIG. 4b, a RGB signal, R-G intensity difference value, and B-G intensity difference value for the portion with a chromatic aberration at the edge in FIG. 4a are shown.

The upper graph in FIG. 4b has two static areas, i.e., a first static area 400 and a second static area 420, and a dynamic area 410. Referring to the two lower graphs in FIG. 4b, which illustrate an R-G intensity difference value and a B-G intensity difference value, it can be seen that there are intensity difference values 411 and 412 in the dynamic area greater than a maximum intensity difference value in the static area or smaller than a minimum intensity difference value in the static area. That is, there is an area in the image of FIG. 4b violating the principle described in FIG. 2. A property of the violation of the principle occurs in the area with a chromatic aberration whether the aberration is a lateral chromatic aberration or a longitudinal chromatic aberration.

The present invention proposes an image processing scheme for detecting an area determined as having a chromatic aberration with only a single image using such a principle and correcting the chromatic aberration using a suitable value.

Figure 5:
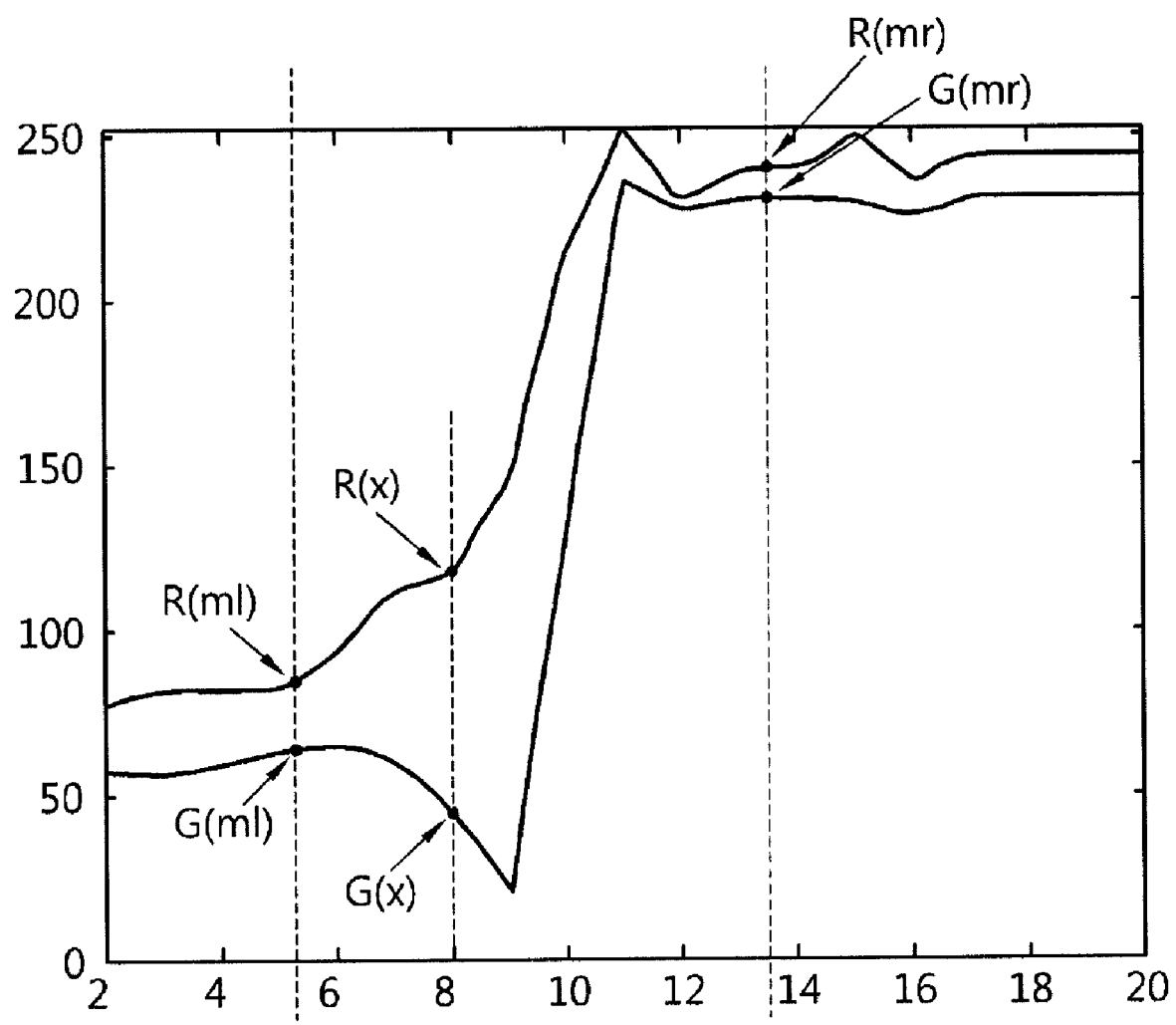
FIG. 5 illustrates a method for detecting a chromatic aberration according to one example embodiment of the present invention.

FIG. 5 illustrates a method for detecting a chromatic aberration according to one example embodiment of the present invention.

In order to detect a chromatic aberration area, a width of an edge of an image with a chromatic aberration is first set. If it is assumed that a start point of a dynamic area in independent first-order signals on horizontal and vertical axes is indicated by ml and an end point of a dynamic area is indicated by mr, pixels not included in Equations 1 and 2 among pixels between the two points are all detected as having the chromatic aberration. In FIG. 5, elements required for measuring a intensity difference between red and green colors and detecting a chromatic aberration are shown, in which R(ml) denotes a value of a red signal at the start point of the dynamic area, R(mr) denotes a value of the red signal at an end point of the dynamic area, G(ml) denotes a value of a green signal at the start point of the dynamic area, and G(mr) denotes a value of the green signal at the end point of the dynamic area. R(x) and G(x) represent values of red and green signals according to locations of pixels in the dynamic area.

Using these values and Equation 1, a determination may be made as to whether a red-green chromatic aberration occurs. Equation 1 is an equation for detecting a chromatic aberration for a red-green intensity difference:

$$\min(R(m_l)-G(m_l),R(m_r)-G(m_r))-\epsilon_0 \leq R(x)-G(x) \leq \max(R(m_l)-G(m_l),R(m_r)-G(m_r))+\epsilon_0,$$  Equation 1 where $\epsilon_0$ denotes a measurement tolerance and is preferably set to a very small value.

Meanwhile, Equation 2 is an equation for detecting a chromatic aberration for a blue-green intensity difference:

$$\min(B(m_l)-G(m_l),B(m_r)-G(m_r))-\epsilon_0 \leq B(x)-G(x) \leq \max(B(m_l)-G(m_l),B(m_r)-G(m_r))+\epsilon_0,$$  Equation 2 where B(ml) denotes a value of the blue signal at the start point of the dynamic area, B(mr) denotes a value of the blue signal at the end point of the dynamic area, and B(x) denotes a value of the blue signal according to pixel locations in the dynamic area. Also, $\epsilon_0$ denotes a measurement tolerance.

Figure 6A:
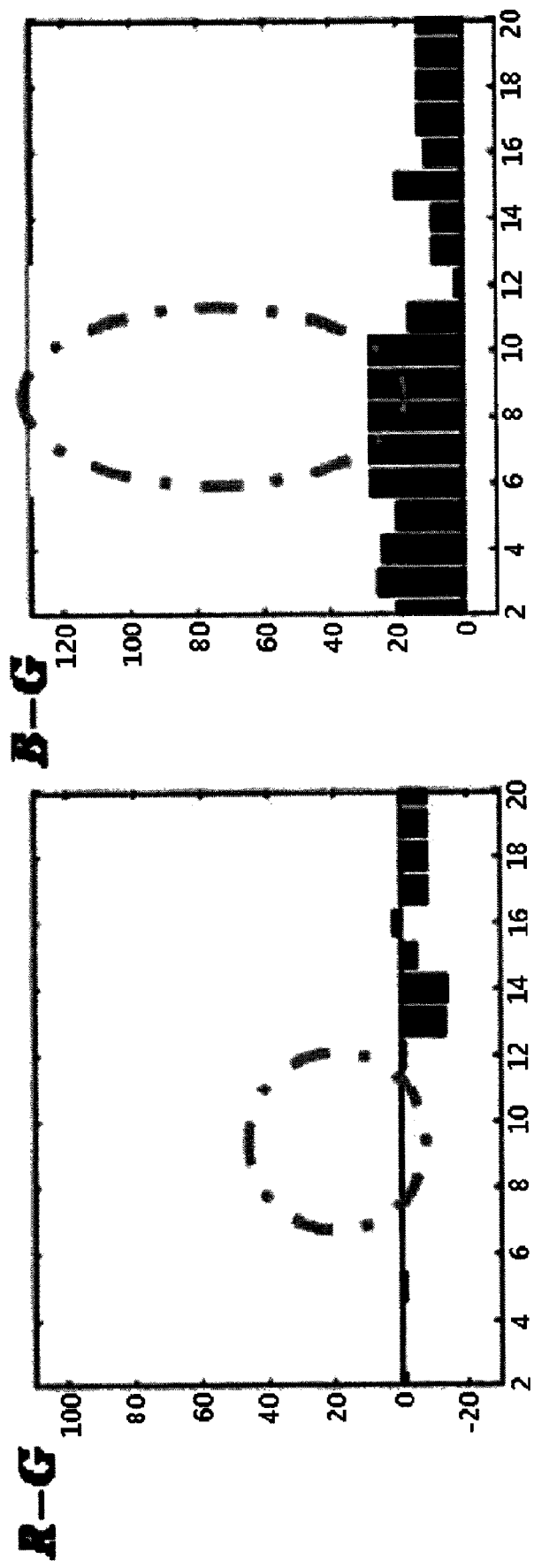
FIGS. 6a to 6c illustrate a method for correcting a region with a chromatic aberration according to example embodiments of the present invention.
Figure 6B:
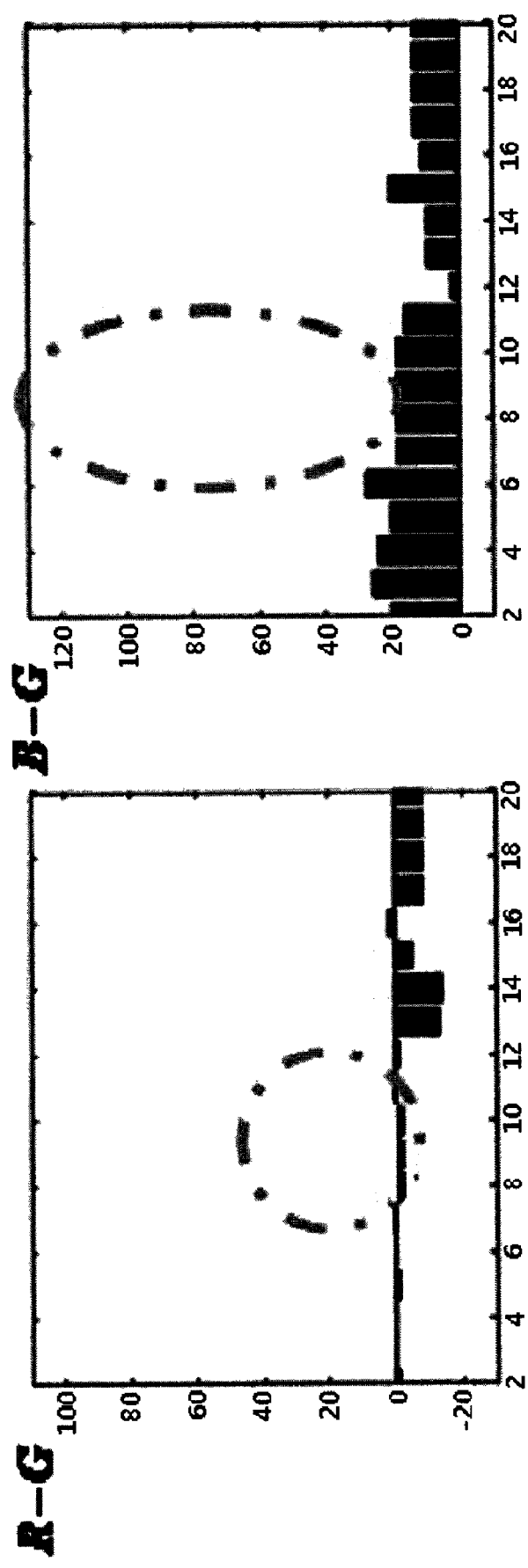
Figure 6C:
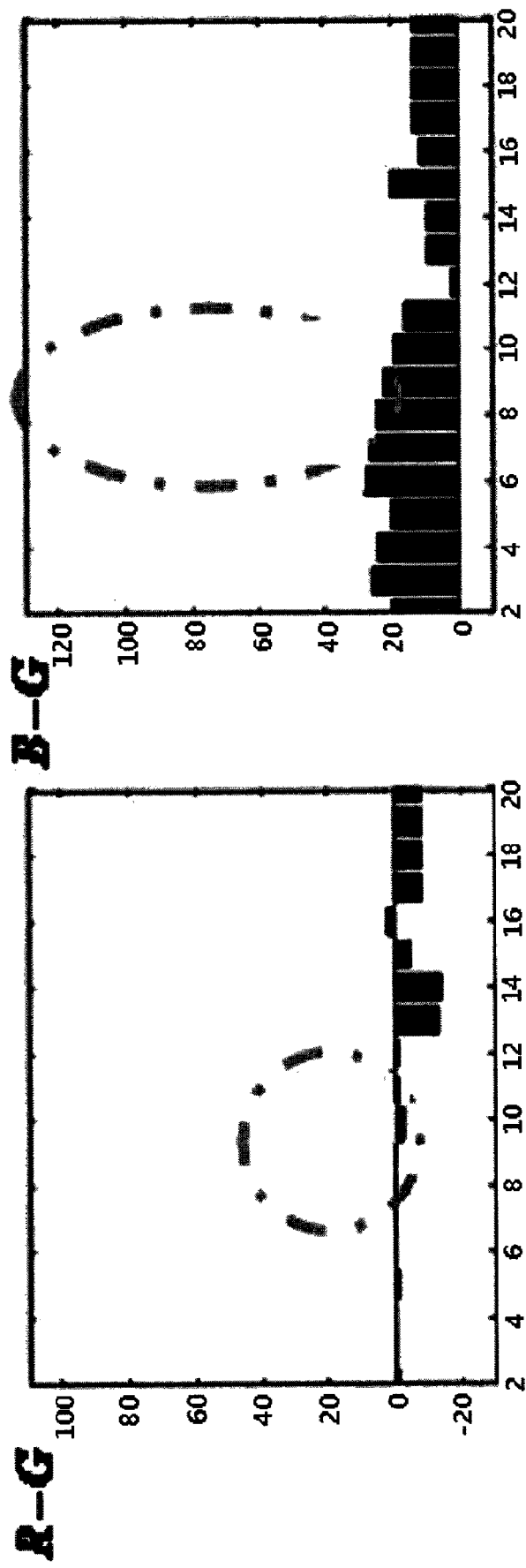

FIGS. 6a to 6c illustrate a method for correcting a region with a chromatic aberration according to example embodiments of the present invention.

When the region with the chromatic aberration is detected using the method described with reference to FIG. 5, correction values for the detected regions 411 and 412 in FIG. 4b are calculated. A R-G or B-G intensity difference value for the regions determined as having the chromatic aberration, such as the region 411 or 412 in FIG. 4b, are then corrected. The correction value is set to a value between the maximum and minimum intensity difference values for the regions 400 and 420 in FIG. 4b. After the intensity difference value is corrected, a green value for a pixel is added to the corrected intensity difference value to calculate red and blue pixel values for a resultant image. Correction value settings are illustrated in three example embodiments in FIGS. 6a to 6c.

FIG. 6a illustrates graphs showing corrected R-G and B-G intensity differences when a correction value is set to a greater of intensity difference values of pixels located directly next to the chromatic aberration region 411 or 412 in the dynamic area 410. FIG. 6b shows a graph showing corrected R-G and B-G intensity differences when the correction value is set to a smaller of the intensity difference values of the pixels located directly next to the chromatic aberration region 411 or 412 in the dynamic area 410.

FIG. 6c illustrates a graph showing corrected R-G and B-G intensity differences when a correction value between the maximum and minimum intensity difference values of the first and second static areas 400 and 420 is applied using linear interpolation.

In the example embodiments of FIGS. 6a to 6c, the intensity difference values of pixels in the aberration region are corrected to have a range of intensity difference values in the static areas. The correction value to be applied may depend on a property of an image to be corrected and may be selected and applied by a user.

Figure 7:
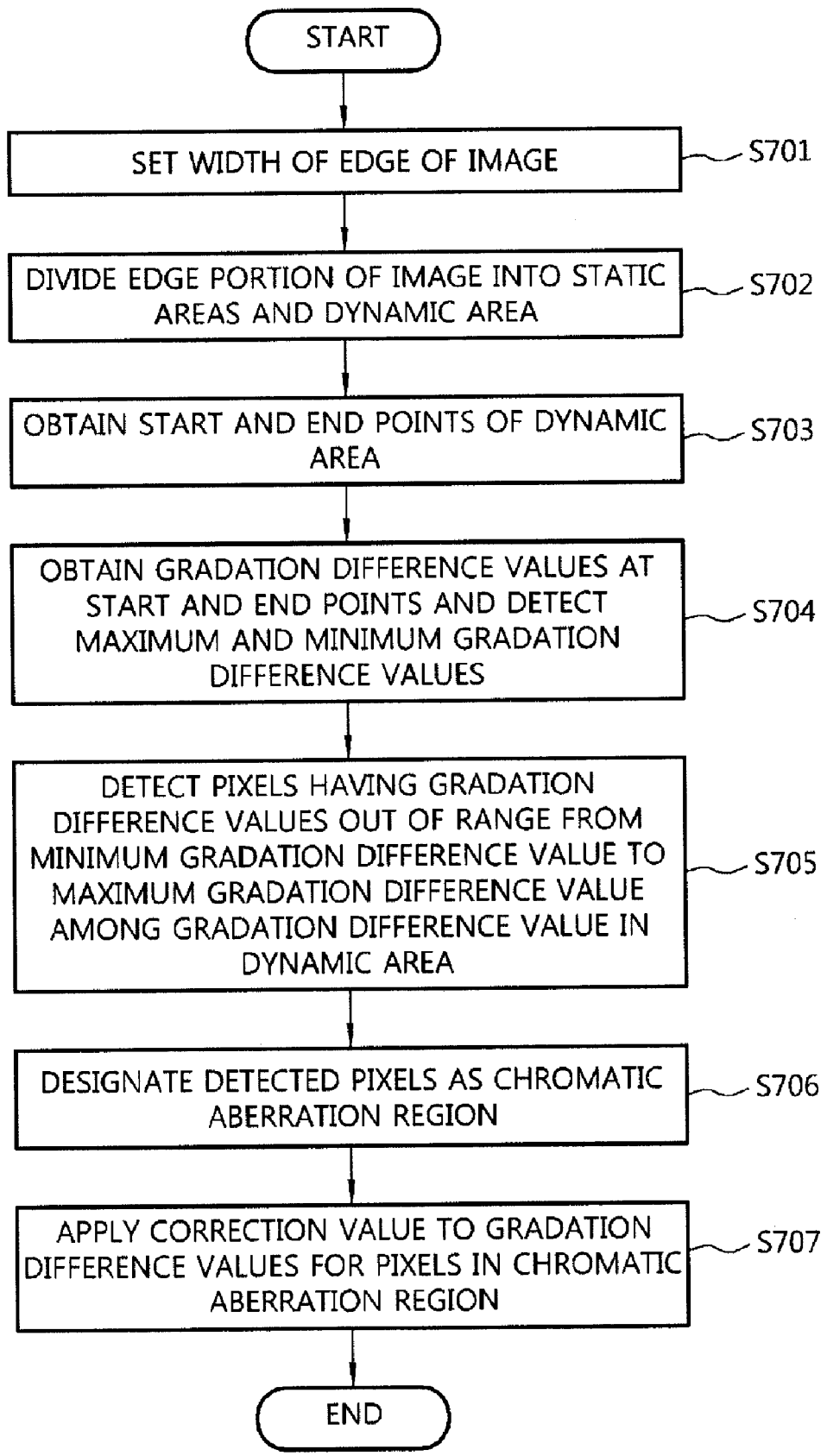
FIG. 7 illustrates a flowchart of a method for detecting and correcting a chromatic aberration according to one example embodiment of the present invention.

FIG. 7 illustrates a flowchart of a method for detecting and correcting a chromatic aberration according to one example embodiment of the present invention.

First, a width of an edge of an image is set to detect a chromatic aberration (S701). The edge portion of the image is then divided into static areas and a dynamic area (S702). In the static areas, a color does not vary or varies only within a certain range, and in the dynamic area, a color varies out of a predetermined range. When the static areas and the dynamic area are set, start and end points of the dynamic area are obtained (S703).

Intensity difference values at the start and end points are obtained using the start and end points, and maximum and minimum intensity difference values are detected (S704). Then, pixels having intensity difference values out of a range between the minimum intensity difference value and the maximum intensity difference value among intensity difference value (R(x)−G(x) or B(x)−G(x)) in the dynamic area are all detected (S705). The detected pixels are designated as a chromatic aberration region (S706). A correction value is applied to intensity difference values for pixels in the region designated as the chromatic aberration region (S707). That is, blue and red signals are represented by the corrected intensity difference values. In three example embodiments, examples of the correction value are shown in FIGS. 6a to 6c.

Figure 8A:
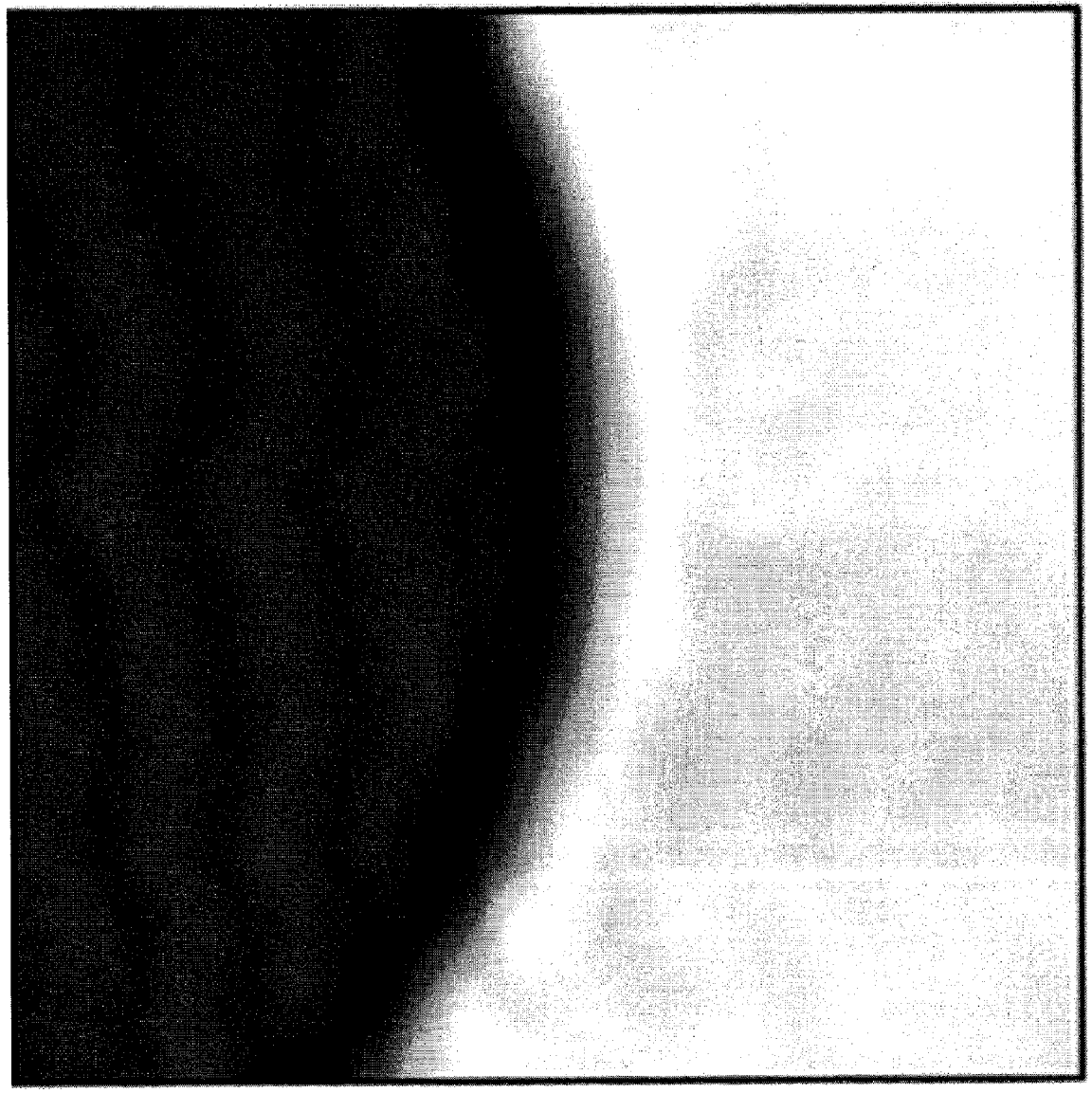
FIG. 8a illustrates an image obtained by performing chromatic aberration correction on the image of FIG. 4 according to one example embodiment of the present invention.

FIG. 8a illustrates an image obtained by performing chromatic aberration correction on the image of FIG. 4 according to one example embodiment of the present invention, and FIG. 8b illustrates graphs showing a RGB signal and a intensity difference value obtained by performing the chromatic aberration correction on the image of FIG. 4 according to one example embodiment of the present invention.

That is, the graphs in FIG. 8b show the results after detecting the chromatic aberration area and completing the intensity difference value correction on the detected chromatic aberration area (e.g., 411 or 412 in FIG. 4b) according to the present invention. It can be seen from the two graphs in FIG. 8b that an area violating the principle of Equation 1 or 2 has disappeared. This effect has led to a visual effect such as a blurred color fringe outside a circular shape of the image of FIG. 8a.

Figure 9B:
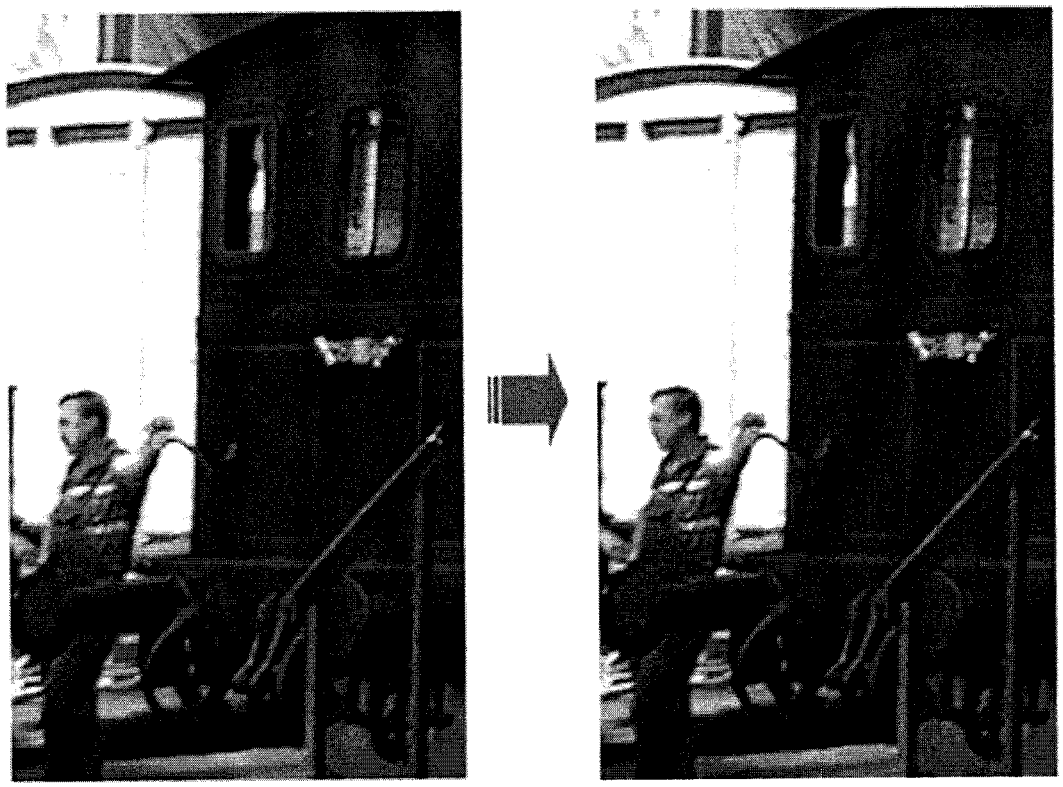

FIGS. 9a and 9b illustrate images obtained by performing the chromatic aberration correction according to example embodiments of the present invention.

It can be seen from a comparison between a pre-correction image and a post-correction image in FIGS. 9a and 9b that a color fringe has disappeared or at least been blurred from a boundary portion of each object in the pre-correction image.

Although the example embodiments of the present invention have been described in connection with the RGB color model, it should be understood that the present invention is not limited to the RGB color model but may be applied to models such as CMY, HSI, CIE and YCbCr color models.

The present invention can perform efficient chromatic aberration correction with only the chromatic aberration image without additional information, such that the present invention can be applied to all camera products including small cameras with non-detachable lenses. Also, since the chromatic aberration detection and correction are performed with only the chromatic aberration image, the present invention may be used to process images obtained through the Internet in various applications, such as Photoshop.

According to the present invention, the chromatic aberration can be corrected for directly photographed images and estimation of a center of the distortion is not required such that a cut portion of an image can be effectively corrected. Since the chromatic aberration is detected by analyzing an image characteristic of a chromatic aberration area instead of designating an area of a specific chromatic aberration color, all areas with chromatic aberrations can be simultaneously detected and corrected whether the aberration is a lateral chromatic aberration or a longitudinal chromatic aberration and irrespective of chromatic aberration colors, thereby providing excellent correction performance above other conventional schemes.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is a claimed is:

1. A method for processing an image, the method comprising:
    dividing an edge portion of the image into static areas where a color component value varies below a reference value and a dynamic area where a color component value varies above the reference value;
    calculating, by a computer processor, a plurality of intensity difference values between a reference color component and a comparative color component for all pixels in the static areas;
    identifying a maximum intensity difference value and a minimum intensity difference value in the plurality of intensity difference values;
    determining at least one pixel in the dynamic area having an intensity difference value outside a range bounded by the maximum intensity difference value and the minimum intensity difference value, as a chromatic aberration region; and
    correcting the intensity difference value for the at least one pixel in the chromatic aberration region.

2. The method of claim 1, wherein correcting the intensity difference value comprises correcting the intensity difference value for the pixels in the chromatic aberration region using a correction value in the plurality of intensity difference values.

3. The method of claim 2, wherein the correction value is set as one between the maximum and minimum intensity difference values using linear interpolation.

4. The method of claim 1, wherein the comparative color component and the reference color component are colors in a RGB color space.

5. The method of claim 4, wherein the comparative color component is a green color.

6. The method of claim 1, wherein the comparative color component and the reference color component are colors in any of a CMY color space, a HSI color space, a CIE color space, and a YCbCr color space.

7. The method of claim 1, further comprising representing the reference color component for the at least one pixel in the chromatic aberration region on which correction for the intensity difference values is performed.

8. An apparatus for processing an image, wherein the apparatus:
    detects a chromatic aberration by dividing an edge portion of the image into static areas where a color component value varies below a reference value and a dynamic area where a color component value varies above the reference value, calculating a plurality of intensity difference values between a reference color component and a comparative color component for all pixels in the static areas, identifying a maximum intensity difference value and a minimum intensity difference value in the plurality of intensity difference values, and determining at least one pixel in the dynamic area having an intensity difference value outside a range bounded by the maximum intensity difference value and the minimum intensity difference value, as a chromatic aberration region; and
    corrects the chromatic aberration by correcting the intensity difference value for the at least one pixel in the chromatic aberration region using a correction value in the range.

9. The apparatus of claim 8, wherein the comparative color component and the reference color component are colors in a RGB color space.

10. The apparatus of claim 9, wherein the comparative color component is a green color.

11. The apparatus of claim 8, wherein the comparative color component and the reference color component are colors in any of a CMY color space, a HSI color space, a CIE color space, and a YCbCr color space.

12. A method for detecting and correcting a chromatic aberration in image processing that represents colors based on a RGB color space, the method comprising:
    dividing an edge portion of an image into static areas where a color component value varies below a reference value and a dynamic area where a color component value varies above the reference value;
    calculating, by a computer processor, a plurality of intensity difference values between a green color and a first reference color component, and between the green color and a second reference color component for all pixels in the static areas;
    identifying a maximum intensity difference value and a minimum intensity difference value in the plurality of intensity difference values;
    determining at least one pixel in the dynamic area having an intensity difference value outside a range bounded by the maximum intensity difference value and the minimum intensity difference value, as a chromatic aberration region; and
    correcting the intensity difference value for the at least one pixel in the chromatic aberration region to represent the first and second reference color components.

* * * * *